US005327200A

United States Patent [19]

Sakakibara et al.

[11] Patent Number: 5,327,200

[45] Date of Patent: Jul. 5, 1994

[54] TRANSFER SHEET-CARRYING MEMBER AND IMAGE FORMING APPARATUS

[75] Inventors: Teigo Sakakibara; Noriko Ohtani, both of Yokohama, Japan

[73] Assignee: Canon Kabushiki Kaisha, Tokyo, Japan

[21] Appl. No.: 921,239

[22] Filed: Jul. 29, 1992

[30] Foreign Application Priority Data

Aug. 1, 1991 [JP] Japan .................................. 3-214245

[51] Int. Cl.[5] ........................ G03G 15/16; B32B 27/00

[52] U.S. Cl. .................................... 355/274; 355/273; 428/323; 428/408; 428/702; 428/906

[58] Field of Search ............... 355/275, 274, 273, 271; 428/702, 323, 408, 906

[56] References Cited

U.S. PATENT DOCUMENTS

| | | | |
|---|---|---|---|
| 4,737,816 | 4/1988 | Inoue et al. . | |
| 4,853,736 | 8/1989 | Goto et al. | 355/274 X |
| 5,091,751 | 2/1992 | Inoue et al. | 355/274 |
| 5,138,363 | 8/1992 | Yuge | 355/255 X |
| 5,172,173 | 12/1992 | Goto et al. | 355/275 |

FOREIGN PATENT DOCUMENTS

| | | |
|---|---|---|
| 0400986 | 12/1990 | European Pat. Off. . |
| 0400996 | 12/1990 | European Pat. Off. . |
| 4015210 | 11/1990 | Fed. Rep. of Germany . |

*Primary Examiner*—A. T. Grimley
*Assistant Examiner*—Nestor R. Ramirez
*Attorney, Agent, or Firm*—Fitzpatrick, Cella, Harper & Scinto

[57] ABSTRACT

A transfer sheet-carrying member for use in a transfer-type electrophotographic image forming apparatus is characterized by having a surface sheet showing a downwardly convex current-voltage characteristic across its thickness such that when a first test current $I_{10}$ is passed at an applied voltage of 10 volts, a second test current $I_{50}$ is passed at an applied voltage of 50 volts and a third test current $I_{4000}$ is passed at an applied voltage of 4000 volts, the current-voltage characteristic satisfies the relationships of: $I_{50}<5\times I_{10}$ and $I_{50}\leqq I_{4000}/100$. The current-voltage characteristic may be regarded as downwardly convex, and the current passage is suppressed at a low voltage level. As a result, a certain amount of transfer charge is provided to the surface sheet at a single charging operation to suppress transfer irregularities.

12 Claims, 3 Drawing Sheets

TRANSFER SHEET-CARRYING MEMBER AND IMAGE FORMING APPARATUS

FIELD OF THE INVENTION AND RELATED ART

The present invention relates to a transfer sheet-carrying member and an image forming apparatus, particularly a transfer sheet-carrying member for carrying a transfer sheet to which is transferred a toner image formed by electrophotography or electrostatic recording, and an image forming apparatus including such a transfer sheet-carrying member. Examples of such an image forming apparatus may include electrophotographic copiers or printers of the white-and-black type, monochromatic type or full color type, and other various recording instruments.

Hitherto, there have been used various types of transfer sheet-carrying members for carrying a transfer sheet to which an image is transferred from an image-bearing member. For example, in an electrophotographic apparatus including respective means for image forming steps including charging-imagewise exposure - toner development - transfer - cleaning, a transfer drum and a transfer apparatus as illustrated in FIGS. 1 and 2 have been used as means for transferring a toner image formed on a photosensitive member to a transfer sheet (such as paper).

Referring to FIGS. 1 and 2, a transfer drum 10 as an example of a transfer sheet-carrying member includes rings or short cylinders 12 and 13 and a connecting part 14 for connecting the rings 12 and 13, together forming a generally cylindrical frame structure while leaving an opening, and a surfacing sheet or member 11 applied to cover the opening. The connecting part 14 is further provided with a transfer sheet holder or gripper 15 for holding a transfer sheet supplied from a transfer sheet (paper) supplier (not shown). Inside and outside the transfer drum 10 are further disposed a transfer discharger 21, and an inner discharger for charge removal 23 and external dischargers for charge removal 22 and 24 which in combination from charge removing means.

In the step of transferring a toner image from a photosensitive drum 33, the transfer drum 10, particularly the surfacing sheet 11 thereof, is subject to various mechanical and electrical external forces in connection with conveyance of a transfer sheet, transfer charging, charge removal, and cleaning. Accordingly, the surface of the transfer drum is required to have resistances to such external forces, i.e., mechanical strength, wear-resistance and electrical resistance, and also excellent lubricity against a cleaning member, etc.

The surfacing sheet has been conventionally formed by resin films of, e.g., polytetrafluoroethylene, polyester, polyvinylidene fluoride, triacetate and polycarbonate, which have been generally regarded as having high resistivity. In case where such a resin film is used for constituting the surface of a transfer sheet-carrying member, peeling discharge occurs when the transfer sheet is peeled from the photosensitive drum immediately after the transfer, so that the transfer sheet is charged due to the peeling discharge and the resultant charge cannot be leaked but is retained by the transfer sheet and the surface of the transfer drum, thus resulting in disturbance of the toner image on the transfer sheet or hindering uniform transfer charge. In such a case, it has been required to strictly see the transfer conditions, such as accurate control of transfer current, or removal of remaining charges on the surface of the transfer drum by reverse charging or AC charging.

In contrast thereto, it has also been the practice to use a low-resistivity resinous material, such as a low-resistivity resin or a resin containing an electroconductive substance. In such a case, however, there have been frequently encountered difficulties, such as poor transferability of transfer sheets, transfer irregularity and transfer dropout. Further, in such a case of using a low-resistivity resinous material for constituting a surfacing sheet, the irregularity in resistivity absolute value due to an irregularity in sheet thickness is liable to affect the image quality, thus being liable to cause image defects.

Particularly, in recent years, it has been the practice to form a higher resolution latent image for further improvement in image quality and use so-called small-size toner particles with a weight-average particle size of below 10 μm, particularly on the order of 8 μn. As a result, such small-size toner particles are liable to be affected by a slight potential irregularity on the surface of the transfer drum, so that a transfer sheet-carrying member or transfer drum causing further less charge irregularity is desired.

SUMMARY OF THE INVENTION

An object of the present invention is to provide a transfer sheet-carrying member free from causing transfer irregularity or transfer dropout.

Another object of the present invention is to provide an image forming apparatus including such a transfer sheet-carrying member.

According to the present invention, there is provided a transfer sheet-carrying member having a surface sheet showing a current-voltage characteristic across its thickness such that a current $I_{10}$ is passed at an applied voltage of 10 volts, a current $I_{50}$ is passed at an applied voltage of 50 volts and a current $I_{4000}$ is passed at an applied voltage of 4000 volts, satisfying relationships of:

$$I_{50} < 5 \times I_{10} \text{ and } I_{50} \leqq I_{4000}/100.$$

According to another aspect of the present invention, there is also provided an image forming apparatus including such a transfer sheet-carrying member as described above.

The transfer sheet-carrying member of the present invention is characterized by a surfacing sheet showing a specific current-voltage characteristic, which may be referred to as a downwardly convex current-voltage characteristic, i.e., a current-voltage characteristic showing a lower current value at a medium voltage than expected by a linear current-voltage characteristic by connecting current values at low and high voltages.

Because of such a specific current-voltage characteristic of the transfer sheet-carrying member, the image forming apparatus according to the present invention provides good images free from image defects attributable to transfer irregularity and transfer dropout. Further, even when subjected to repetitive durability image forming test by the image forming apparatus, the transfer sheet-carrying member according to the invention can exhibit good transfer performance free from transfer failure or transfer dropout.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
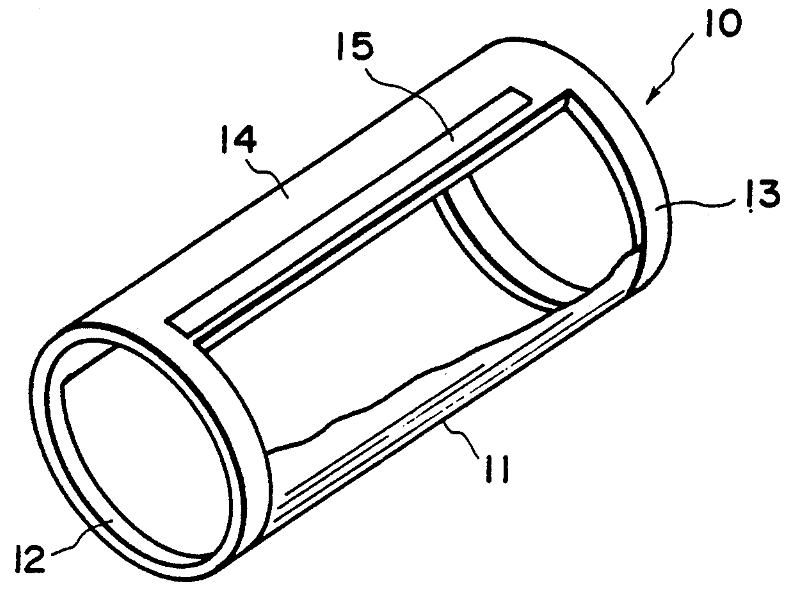
FIG. 1 is a partially broken perspective view of a transfer drum which can embody the transfer sheet-carrying member according to the present invention.
Figure 2:
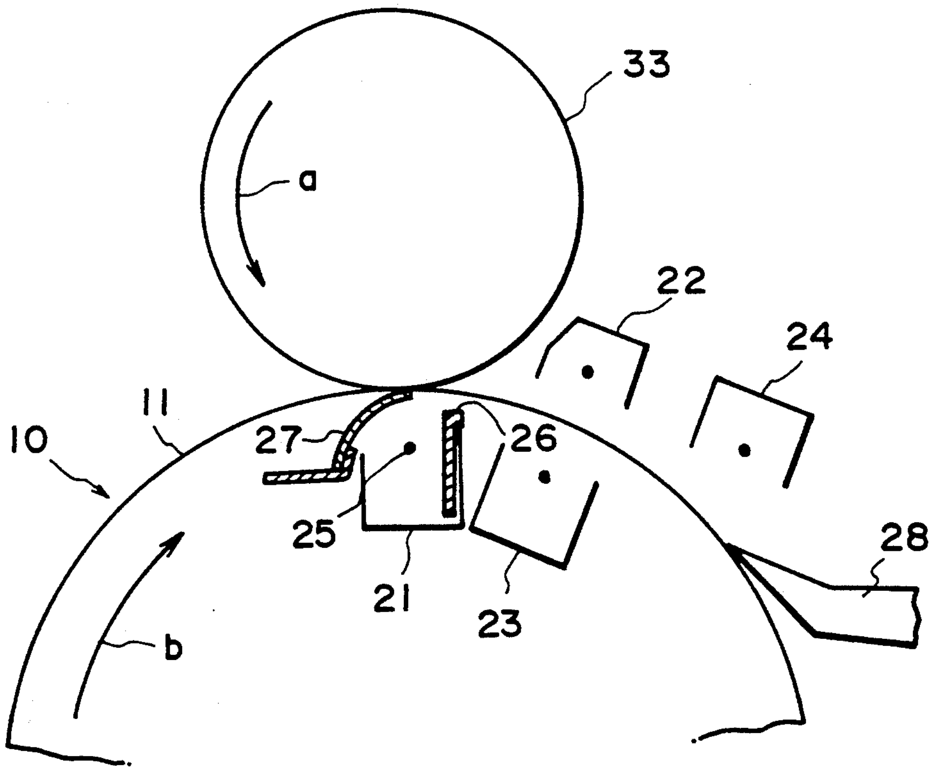
FIG. 2 is a schematic sectional illustration of a relevant part of a transfer apparatus.

As described above, the transfer sheet-carrying member, ordinarily embodied as a transfer drum, is characterized according to the present invention by having a surface sheet showing a current-voltage characteristic across the thickness such that a current $I_{10}$ at an applied voltage of 10 volts, a current $I_{50}$ at an applied voltage of 50 volts and a current $I_{4000}$ at an applied voltage of 4000 volts, satisfy the relationships of:

$$I_{50} < 5 \times I_{10} \text{ and } I_{50} \leqq I_{4000}/100;$$

preferably $I_{50} < 3 \times I_{10}$ and $I_{50} \leqq I_{4000}/150$. As a result, it is possible to effect both the conveyance of a transfer sheet and the separation of the transfer sheet from the transfer sheet-carrying men%her satisfactorily in a compatible manner.

Further, if the transfer sheet-carrying member according to the present invention is used, good images can be obtained with little chance of transfer irregularity and without causing image defects, such as transfer dropout. The mechanism therefor has not been clarified as yet but may be attributable to the above-mentioned downwardly convex current-voltage characteristic representing a relationship such that little current is passed in a low voltage region and a relatively large current is passed in a high voltage region as if it follows a power function of the voltage. As a result, a certain amount of charge can be retained at a single time of charging so that the adsorption and conveyance of transfer sheet (paper) can be effected.

Further, as the surfacing sheet the transfer sheet-carrying member exhibits a so-called barrister effect where a current is not conducted at a low voltage region but is conducted according to a power function at a high voltage region, and it is possible to conduct a transfer current while retaining a certain electric field when a toner is transferred to a transfer sheet, such as transfer paper, so that good images can be obtained. Further, as a current is allowed to pass at a high voltage, the transfer sheet-carrying member does not cause charge-up or excessive accumulation of charge, thus showing a good cycle characteristic. This characteristic is particularly advantageous in a full-color image forming apparatus wherein multiple transfer is performed. More specifically, good images are obtained in repetitive successive image formation without strict setting of transfer conditions, such as accurate control of transfer current values.

Thus, the transfer sheet-carrying member according to the invention is particularly advantageous in case of multiple transfer as in multi-color image formation.

The surfacing sheet of the transfer sheet-carrying member according to the present invention may comprise a resinous film comprising a film of an ordinary resin, such as polytetrafluoroethylene, polyvinylidene fluoride, triacetate, polycarbonate or polyester, containing an electroconductive substance therein, or a film of a resin or resin mixture showing the above-mentioned specific current-voltage characteristic.

Examples of the electroconductive substance which may be contained in the resinous film may include: powder or short fiber of metals, such as aluminum, copper, nickel and silver; electroconductive metal oxides, such as tin oxide, indium oxide, antimony oxide, and bismuth oxide; electroconductive polymers, such as polypyrrole, polyaniline and polymer electrolytes; carbonaceous electroconductive substance in the form of power or fiber, such as carbon fiber, carbon black, fibril carbon and graphite powder; and electroconductive powder surface-coated with such an electroconductive substance.

In the case where the surface of the transfer sheet-carrying member is made of a resin film containing an electroconductive substance, the above-mentioned downwardly convex current-voltage characteristic of the transfer sheet-carrying member according to the present invention may be attributable to an appropriate dispersion state of the electroconductive substance in the resin film, particularly fine dispersion state in and appropriate affinity with the resin of the electroconductive substance.

The resinous film constituting the transfer sheet-carrying member according to the present invention may be formed by a method, such as extrusion, injection molding or casting. The resinous film may be in the form of a rectangular sheet, an endless belt by bonding ends of such a sheet by thermal melt-bonding, ultrasonic melt-bonding or by using an adhesive, or any form most suitable for an image forming apparatus in which the transfer sheet-carrying member is used. The film may preferably have a thickness of 20-300 μm, particularly 50-200 μm.

Specific embodiments of the image forming apparatus including a transfer sheet-carrying member according to the present invention are explained with reference to FIGS. 3 and 4 respectively illustrating a multi-color (full-color) image forming apparatus.

Figure 3:
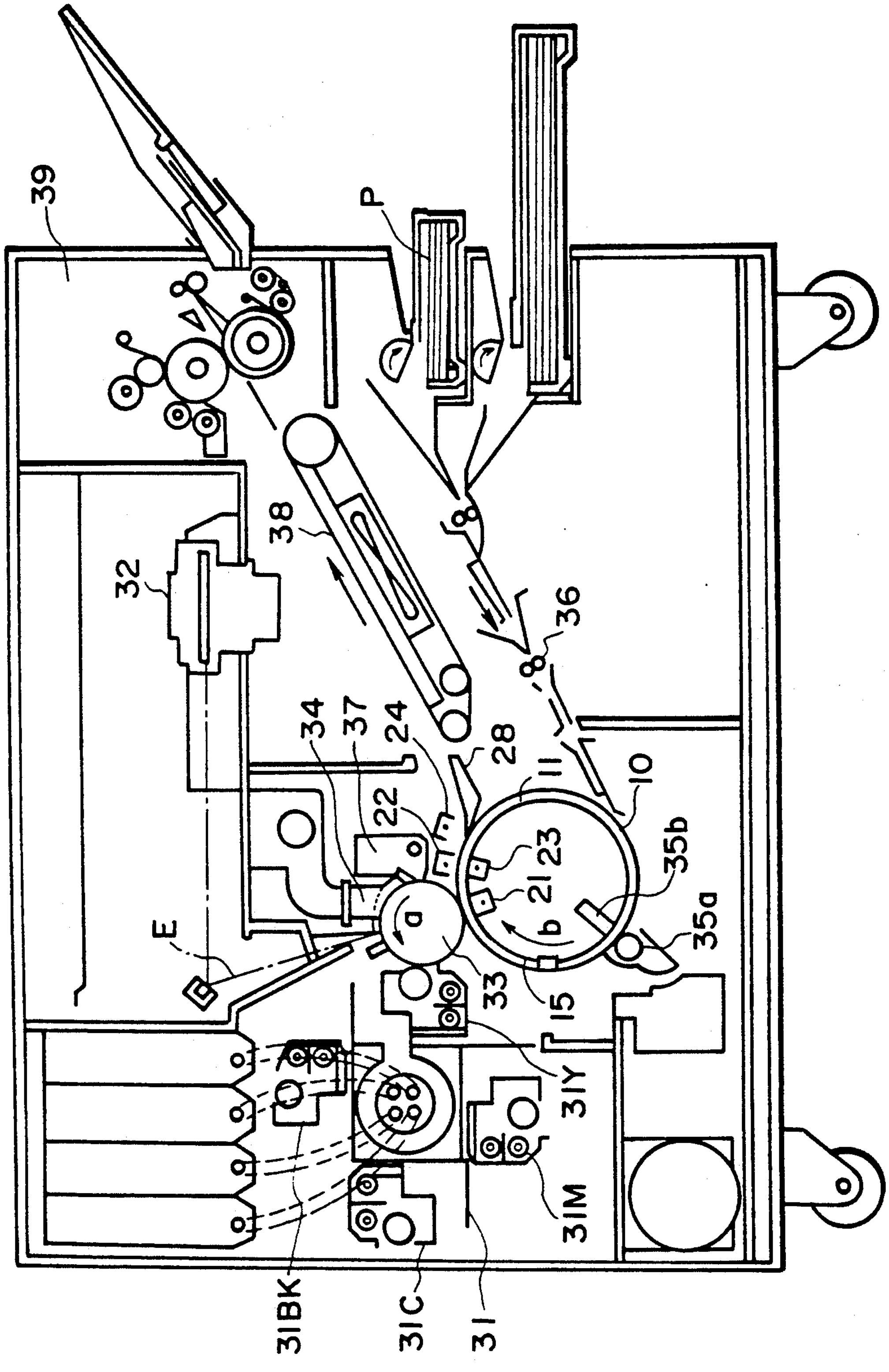
FIG. 3 is a schematic illustration of a relevant part of an embodiment of the image forming apparatus according to the present invention.

Referring to FIG. 3 first, the multi-color image forming apparatus includes an image bearing member, i.e., a photosensitive drum 33, axially supported so as to rotate in the direction of an arrow a and image forming means disposed around the outer periphery of the drum 33. The image forming means may generally include arbitrary means but, in this embodiment, include: a primary charger 34 for uniformly charging the photosensitive drum; exposure means 32, such as a laser exposure means, for illuminating the photosensitive drum 33 with a color-separated light image or a light image corresponding thereto to form an electrostatic latent image on the photosensitive drum 33; and a rotary developing apparatus 31 for converting the electrostatic latent image on the photosensitive drum 33 into a visible image.

The rotary developing apparatus 31 include four developing devices 31Y, 31M, 31C and 31BK containing a yellow developer, a magenta developer, a cyan developer and a black developer, respectively, and a rotatably supported almost cylindrical housing containing the four developing devices. The rotary developer 31 is so constituted that the developing devices of prescribed colors are successively moved and disposed at a position facing the outer periphery of the photosensitive drum to develop the electrostatic latent images on the Photosensitive drum, thus effecting development with the four colors of developers, by rotating the housing.

The resultant visual images, i.e., toner images, are successively transferred to a transfer sheet P carried on a transfer apparatus 10 in the form of a rotatably supported transfer drum.

In the image formation, the photosensitive drum 33 is uniformly charged by the primary charger 34 and then illuminated with light image E corresponding to given image data by the exposure means 32 to form an electrostatic latent image on the photosensitive drum 33. The electrostatic latent image is developed with resinous toners supplied from the rotary developing apparatus 31 to form a visual toner image.

On the other hand, a transfer sheet P is supplied to the transfer drum 10 in synchronism with the toner image through the registering rollers 36 and is conveyed in the direction of an arrow as shown while its leading end is held by a gripper 15, etc.

Then, a surface sheet 11 of the transfer drum 11 is subjected to corona discharge of a polarity opposite to that of the toner at its back surface in a region confronting the photosensitive drum 33 by a transfer discharger 21, whereby the toner image on the photosensitive drum 33 is transferred to the transfer sheet P.

The image formation, development and transfer are repeated in a prescribed number of cycles.

After the prescribed times of the transfer step, the transfer sheet P is peeled off from the transfer drum 10 by the action of a separation claw 28 while being subjected to charge removal by means of dischargers 22–24 for charge removal. The transfer sheet P thus separated is conveyed by a conveyer belt 38, subjected to thermal fixation of the toner image by a fixing device 39 and then discharged out of the system.

On the other hand, the photosensitive drum 33 is subjected to removal of residual toner on the surface by a cleaning apparatus 37 and then subjected to a subsequent cycle of the image forming process.

Further, the surface sheet 11 of the transfer drum 10 is also cleaned by a cleaning device 35*a* comprising a blade or fur brush and a supplementary cleaning means 35*b*, and then recycled to the image forming process.

In the present invention, it is preferred to dispose an insulating member 26, such as a polycarbonate resin plate, to a shielding plate on a downstream side of the transfer corona discharger 21 with respect to the rotation direction denoted by the arrow b of the transfer drum 10 so as to increase the proportion of transfer corona directed toward the photosensitive drum 33 among the total amount of the transfer corona.

In the present invention, it is further possible to dispose an elastic pressing member 27 extending from the upstream to the downstream side of the surface sheet 11 and contacting the backside of the surface sheet 11. The pressing member 2 may preferably be composed of a synthetic resin film having a volume resistivity of at least $10^{10}$ Ω.cm, particularly at least $10^{14}$ Ωcm, of, e.g., polyethylene, polypropylene, polyester or polyethylene terephthalate, and may be disposed over the entire transfer region in the transverse direction.

The pressing member 27 is used to press the surface sheet 11 by its own elasticity, and the front end thereof may preferably be positioned at a point where the transfer sheet P completing or initiating its contact with the photosensitive drum 33 or the vicinity of such points.

Figure 4:
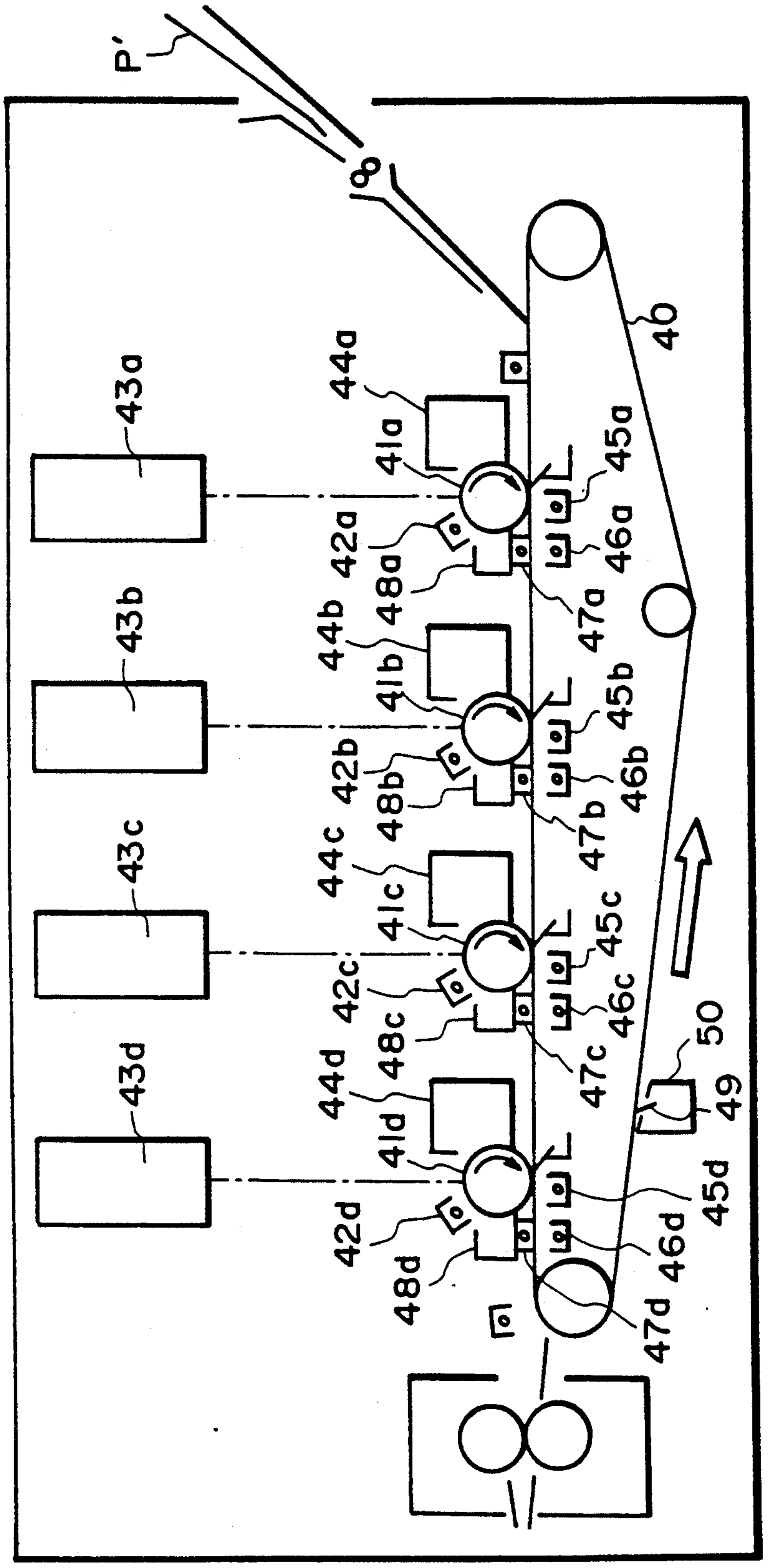
FIG. 4 is a schematic illustration of a relevant part of an embodiment of the image forming apparatus according to the present invention.

FIG. 4 illustrates an image forming apparatus which includes a transfer sheet-carrying member having a surface sheet in the form of an endless belt. Referring to FIG. 4, the image forming apparatus includes photosensitive drums 41*a*–41*d*, around which are disposed primary chargers 42*a*–42*d*, exposure means 43*a*–43*d*, developing devices 44*a* –44*d*, transfer chargers 45*a*–45*d*, charge-removing dischargers 46*a*–46*d* and 47*a*–47*d*, and cleaning means 48*a*–48*d* for the photosensitive drums 41*a*–41*d* so as to form apparatus units including and surrounding the photosensitive drums 41*a*–41*d*. Below these units so as to pass through the units, a surface sheet 40 in the form of an endless belt is disposed so as to form a transfer sheet-carrying member and is equipped with a cleaning device 50 including a urethane blade 49.

A transfer sheet P' is supplied by feeding rollers and transferred by the transfer sheet-carrying member 40 through the transfer positions where the transfer dischargers 45*a*–45*d* are disposed.

Hereinbelow, the present invention will be described more specifically based on Examples, wherein "part(s)" means "part(s) by weight".

EXAMPLE 1

35 parts of hexamethylene diisocyanate ("Coronate 2507", mfd. by Nippon Polyurethane Kogyo K.K.), 35 parts of polyester polyol ("Nippolan 800", mfd. by Nippon Polyurethane Kogyo K.K.), 5 parts of "Ketjen Black EC" (trade name, mfd. by Ketjen Black International Co.), 10 parts of methyl cellosolve) and 10 parts of methyl ethyl ketone, were mixed with each other and subjected to 20 hours of dispersion in a sand mill. The resultant liquid was cast and hardened for 2 hours at 140° C. to form a 90 μm-thick resin film.

A 5 cm×5 cm sample film was cut out from the above resin film. One surface thereof was entirely coated with a vapor-deposited Au film, and a 5 $cm^2$-circular gold film pattern was also formed by vapor deposition at the center on the other surface of the sample film. The current-voltage characteristic of the sample film was evaluated by using a PA meter (available from Hewlett-Packard Co.) to measure a current passing between the gold films applied on both sides of the sample film, i.e., across the thickness of the film, while applying various voltages across the film thickness. The measured currents were $1.0\times10^{10}$ (A) and 10 volts, $2.0\times10^{-10}$ (A) at 50 volts, and $3.4\times10^{-7}$ (A) at 4000 volts, respectively.

Referring to FIG. 1, the above-prepared resin film was applied as a surface sheet 11 between two terminal cylinders 12 and 13 of aluminum and both ends thereof were fixed on a connecting beam 14 connecting the cylinders 12 and 13 to form a transfer drum 10 as shown, which was incorporated in an image forming apparatus as shown in FIG. 3.

In this Example, the transfer drum 10 had a diameter of 160 mm and was set to rotate at a peripheral speed of 160 mm/sec., which was identical to a peripheral speed of 160 mm/sec of the photosensitive drum 33, i.e., the process speed. The transfer corona discharger 21 was provided with an opening width of 19 mm and a discharge wire 25, which was disposed 10.5 mm distant from the outer periphery of the photosensitive drum 33 and 16 mm above the bottom shielding plate of the transfer corona discharger 21 and was supplied with a positive DC voltage of 5.0 kV for corona discharge. The pressing member 27 comprised a 100 μm-thick polyethylene terephthalate resin film.

A negatively charged latent image was formed on the photosensitive drum 33 was subjected to reversal development with a toner having a weight-average diameter of 8 μm which comprised a resin, a colorant and small amounts of additives for charge control and improved lubricity and had been also negatively charged triboelctrically by friction with carrier particles in any one of the developing devices 31Y, 31M, 31C and 31BK. The resultant toner image was transferred to a sheet of transfer paper (95 μm-thick plain paper) carried by the transfer drum 10 described above.

The above-mentioned development and transfer steps were repeated for magenta, cyan, yellow and black toners successively in this order on the same transfer paper.

The transfer paper carrying the resultant full-color toner image was then separated from the transfer drum 10 and subjected to fixation by the fixing apparatus.

The surface of the surface sheet 11 of the transfer drum 10 after the transfer was cleaned by fur brush of the cleaning device 35*a* and a backing member 35*b* as an auxiliary cleaning means.

In the above-described manner, an image forming durability test of 10000 sheets was performed by using the above-mentioned multi-color electrophotographic copying apparatus, whereby good images free from transfer irregularity were obtained from the initial stage and similarly good images were obtained also after the durability test.

EXAMPLE 2

A resin film was prepared and evaluated in the same manner as in Example 1 except that 70 parts of the polymer (polyurethane mixture) together with 30 parts of $SnO_2$ instead of the carbon black. The results are shown in Table 1 appearing hereinafter together with those of Example 1.

EXAMPLE 3

A resin film was prepared and evaluated in the same manner as in Example 1 except that 95 parts of a polymer represented by the following structural formula

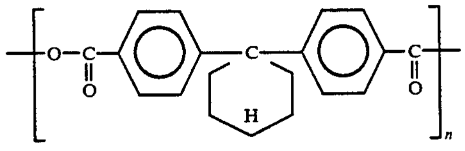

and having a viscosity-average molecular weight of 80,000 was used instead of the polymer used in Example 1 and combined with 5 parts of the same carbon black as used in Example 1. The results are also shown in Table 1.

EXAMPLE 4

A resin film was prepared in the same manner as in Example 3 except that the polymer of Example 3 was used in an Mount of 75 parts and-combined with 25 parts of $SnO_2$ instead of the carbon black, and the resultant resin film was evaluated in the same manner as in Example 1. The results are also shown in Table 1.

COMPARATIVE EXAMPLE 1

A resin film was prepared and evaluated in the same manner as in Example 1 except that the polymer and the carbon black used in Example 1 were replaced by 100 parts of polyvinylidene fluoride alone. The results ar also shown in Table 1.

EXAMPLE 5

A resin film was prepared in a thickness of 150 μm in a similar manner as in Example 1 by using 95 parts of a polymer represented by the following structural formula:

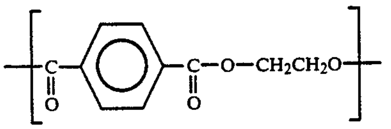

instead of the polymer used in Example 1 in combination with 5 parts of the same carbon black as used in Example 1. The current-voltage characteristic of the resultant resin film was measured in the same manner as in Example 1. The results are also shown in Table 1.

The resin film was shaped in the form of an endless belt and used as a transfer sheet-carrying member 40 in an image forming apparatus as shown in FIG. 4. The performance of the transfer sheet-carrying member was evaluated in a durability test of 10000 sheets of image formation by using similar toners as used in Example 1. As a result, good images free from transfer irregularity were obtained at the initial stage, and stable images free from irregularity were obtained also after the durability test.

COMPARATIVE EXAMPLE 2

A resin film was prepared and evaluated as a surface sheet in the same manner as in Example 5 except that 90 parts of polyethylene terephthalate resin was used and combined with 10 parts of carbon black. The results are also shown in Table 1.

TABLE 1

| | Current (A) Applied voltage | | | Image quality in durability test | |
|---|---|---|---|---|---|
| | 10 V | 50 V | 4000 V | Initial stage | Final stage |
| Example | | | | | |
| 1 | $1.0 \times 10^{-10}$ | $2.0 \times 10^{-10}$ | $3.4 \times 10^{-7}$ | good | good |
| 2 | $2.5 \times 10^{-11}$ | $4.7 \times 10^{-11}$ | $8.2 \times 10^{-9}$ | good | good |
| 3 | $2.3 \times 10^{-9}$ | $4.1 \times 10^{-9}$ | $1.4 \times 10^{-6}$ | good | good |
| 4 | $4.3 \times 10^{-10}$ | $6.2 \times 10^{-10}$ | $1.6 \times 10^{-7}$ | good | good |
| 5 | $2.2 \times 10^{-12}$ | $4.1 \times 10^{-12}$ | $2.1 \times 10^{-9}$ | good | good |
| Comp. Example | | | | | |

TABLE 1-continued

| | Current (A) Applied voltage | | | Image quality in durability test | |
|---|---|---|---|---|---|
| | 10 V | 50 V | 4000 V | Initial stage | Final stage |
| 1 | $1.0 \times 10^{-8}$ | $1.7 \times 10^{-8}$ | $1.9 \times 10^{-6}$ | good | *1 |
| 2 | $2.2 \times 10^{-9}$ | $4.8 \times 10^{-8}$ | $2.4 \times 10^{-5}$ | good | *2 |

*1: Transfer irregularity occurred.
*2: Transfer dropout occurred.

What is claimed is:

1. A transfer sheet-carrying member having a surface sheet showing a downwardly convex current-voltage characteristic across its thickness such that a when a first test current $I_{10}$ is passed at an applied voltage of 10 volts, a second test current $I_{50}$ is passed at an applied voltage of 50 volts and a third test current $I_{4000}$ is passed at an applied voltage of 4000 volts, the current-voltage characteristic satisfies the relationships of:

$$I_{50} < 5 \times I_{10} \text{ and } I_{50} \leqq I_{4000}/150.$$

2. A transfer sheet-carrying member according to claim 1, wherein $I_{10}$, $I_{50}$ and $I_{4000}$ satisfy relationships of $I_{50} < 3 \times I_{10}$ and $I_{50} \leqq I_{4000}/150$.

3. A transfer sheet-carrying member according to claim 1 or 2, wherein the surface sheet comprises a resin film containing an electroconductive substance.

4. A transfer sheet-carrying member according to claim 3, wherein said electroconductive substance is selected from the group consisting of metals, electroconductive metal oxides and carbon.

5. A transfer sheet-carrying member according to claim 3, wherein said electroconductive substance is electroconductive powder and is dispersed in the resin film.

6. A transfer sheet-carrying member according to claim 3, wherein the resin film has a thickness of 20 μm–300 μm.

7. An image forming apparatus, including a transfer sheet-carrying member having a surface sheet, wherein the surface sheet shows a downwardly convex current-voltage characteristic across its thickness such that when a first test current $I_{10}$ is passed at an applied voltage of 10 volts, a second test current $I_{50}$ is passed at an applied voltage of 50 volts and a third test current $I_{4000}$ is passed at an applied voltage of 4000 volts, the current-voltage characteristic satisfies the relationships of:

$$I_{50} < 5 \times I_{10} \text{ and } I_{50} \leqq I_{4000}/150.$$

8. An image forming apparatus according to claim 7, wherein $I_{10}$, $I_{50}$ and $I_{4000}$ satisfy relationships of $I_{50} < 3 \times I_{10}$ and $I_{50} \leqq I_{4000}/150$.

9. An image forming apparatus according to claim 7 or 8, wherein the surface sheet comprises a resin film containing an electroconductive substance.

10. An image forming apparatus according to claim 9, wherein said electroconductive substance is electroconductive powder and is dispersed in the resin film.

11. An image forming apparatus according to claim 9, wherein the resin film has a thickness of 20 μm–300 μun.

12. An image forming apparatus according to claim 7 or 8, further including a means for transferring a toner image onto a transfer sheet carried by the transfer sheet-carrying member, wherein the toner image comprises toner particles having a weight-average particle size of at most 10 μm.

* * * * *

UNITED STATES PATENT AND TRADEMARK OFFICE

CERTIFICATE OF CORRECTION

PATENT NO. : 5,327,200

DATED : July 5, 1994

INVENTOR(S) : TEIGO SAKAKIBARA, ET AL.

It is certified that error appears in the above-indentified patent and that said Letters Patent is hereby corrected as shown below:

Column [57] ABSTRACT,
line 11, "$I_{4000}$/100." should read --$I_{4000}$/150.--.

Column 2,
line 19, "8µn." should read --8µm.--; and
line 41, "$I_{4000}$/100." should read --$I_{4000}$/150.--.

Column 3,
line 34, "men%her" should read --member--; and
line 51, "barrister" should read --barrier--.

Column 5,
line 9, "Photosensitive" should read --photosensitive--.

Column 8,
line 10, "Mount" should read --amount--; and
line 19, "ar" should read --are--.

Column 9,
line 15, "a" (first occurrence) should be deleted.

Column 10,
line 33, "µun." should read --µm.--.

Signed and Sealed this

Thirteenth Day of December, 1994

Attest:

BRUCE LEHMAN

Attesting Officer

Commissioner of Patents and Trademarks